United States Patent
Baggett et al.

(10) Patent No.: US 10,671,587 B2
(45) Date of Patent: Jun. 2, 2020

(54) REDUCED FIXED LENGTH SORT OF VARIABLE LENGTH COLUMNS

(71) Applicant: International Business Machines Corporation, Armonk, NY (US)

(72) Inventors: Brian L. Baggett, Renton, WA (US); Allan B. Lebovitz, Morgan Hill, CA (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 15/476,534

(22) Filed: Mar. 31, 2017

(65) Prior Publication Data

US 2018/0285428 A1    Oct. 4, 2018

(51) Int. Cl.
  *G06F 16/22*    (2019.01)
  *G06F 16/2455*    (2019.01)
(52) U.S. Cl.
  CPC .... *G06F 16/2282* (2019.01); *G06F 16/24554* (2019.01)
(58) Field of Classification Search
  CPC .................. G06F 16/156; G06F 16/24578
  USPC ................................................. 707/722, 752
  See application file for complete search history.

(56) References Cited

U.S. PATENT DOCUMENTS

| | | | |
|---|---|---|---|
| 7,007,275 B1* | 2/2006 | Hanson ................ | G06F 9/5055 709/201 |
| 8,706,727 B2 | 4/2014 | Yang et al. | |
| 2009/0006425 A1 | 1/2009 | Barsness et al. | |
| 2009/0292698 A1 | 11/2009 | Remy et al. | |
| 2018/0129691 A1* | 5/2018 | Mathur ............. | G06F 16/24553 707/707 |
| 2018/0150494 A1* | 5/2018 | Schulze .............. | G06F 16/2228 707/707 |

OTHER PUBLICATIONS

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Computer Security Division Information Technology Laboratory, Recommendations of the National Institute of Standards and Technology, Total 7 pages.

(Continued)

*Primary Examiner* — Alexandria Y Bromell
(74) *Attorney, Agent, or Firm* — Janaki K. Davda; Konrad, Raynes, Davda and Victor LLP

(57) ABSTRACT

Provided are techniques for reduced fixed length sort of variable length columns. A fixed length sort is performed to sort a table having rows for a query, wherein the fixed length sort is based on a sort key comprised of a variable length column. A pre-determined number of the rows are read to identify the variable length column as a candidate for truncation. A length for truncating the variable length column is determined based on database statistics and based on the reading of the pre-determined number of the rows. The variable length column is truncated to the determined length to output a truncated variable length column for the sort key. The rows are sorted on the sort key having the truncated variable length column. Results are generated using the sorted rows and returned for the query.

18 Claims, 10 Drawing Sheets

(56) References Cited

OTHER PUBLICATIONS

Heinz et al., "Burst Tries: A Fast, Efficient Data Structure for String Keys" dated 2002, School of Computer Science and Information Technology, RMIT University, Total 31 pages.

Davidson et al. "Efficient Parallel Merge Sort for Fixed and Variable Length Keys", dated 2012, Total 10 pages.

* cited by examiner

SELECT DISTINCT A.ACCOUNT_TYPE, C.CITY, C.LASTNAME, A.ACCOUNT_NUM
FROM ACCOUNTS A, CUSTOMERS C
WHERE A.CUSTOMER_NUM = C.CUSTOMER_NUM

— 300

| ACCOUNT_TYPE CHAR(1) | CITY (VARCHAR(30)) | LASTNAME (VARCHAR(64)) | ACCOUNT_NUM INTEGER |
|---|---|---|---|
| C | SAN JOSE | KING | 123456789 |
| S | SAN JOSE | WILLIAMS | 234567890 |
| S | SAN JOSE | WILLIAMSON | 345678901 |
| C | SAN JOSE | KING | 123456789 |
| S | MOUNTAIN VIEW | JONES | 567890123 |
| S | MOUNTAIN VIEW | JONES | 567890123 |

⇐ 310

⇐ Candidate variable length columns for truncation

FIG. 3

Reordered sort key with variable length columns padded

410

| ACCOUNT_NUM INTEGER | ACCOUNT_TYPE CHAR(1) | LASTNAME (VARCHAR(64)) | CITY (VARCHAR(30)) |
|---|---|---|---|
| 123456789 | C | KING | SAN JOSE |
| 234567890 | S | WILLIAMS | SAN JOSE |
| 345678901 | S | WILLIAMSON | SAN JOSE |
| 123456789 | C | KING | SAN JOSE |
| 567890123 | S | JONES | MOUNTAIN VIEW |
| 567890123 | S | JONES | MOUNTAIN VIEW |

⇧ Fixed length columns
Ordered – highest to lowest cardinality

⇧ Candidate variable length columns for truncation
Ordered – highest to lowest cardinality

FIG. 4

Reordered sort key with truncated variable length columns 510

| ACCOUNT_NUM INTEGER | ACCOUNT_TYPE CHAR(1) | LASTNAME CHAR(8) | CITY CHAR(10) |
|---|---|---|---|
| 123456789 | C | KING---- | SAN JOSE-- |
| 234567890 | S | WILLIAMS | SAN JOSE-- |
| 345678901 | S | WILLIAMS* | SAN JOSE-- |
| 123456789 | C | KING---- | SAN JOSE-- |
| 567890123 | S | JONES--- | MOUNTAIN V* |
| 567890123 | S | JONES--- | MOUNTAIN V* |

Fixed length columns
Ordered – highest to lowest cardinality

Truncated variable length columns
Ordered – highest to lowest cardinality

FIG. 5

Rows sorted in order with truncated variable length columns and with un-truncated variable length columns

| Sort key col1 | Sort key col2 | Sort key col3 | Sort key col4 | Data col1 | Data col2 — 610 |
|---|---|---|---|---|---|
| ACCOUNT_NUM INTEGER | ACCOUNT_TYPE CHAR(1) | LASTNAME CHAR(8) | CITY CHAR(10) | LASTNAME VARCHAR(64) | CITY VARCHAR(30) |
| 123456789 | C | KING---- | SAN JOSE-- | 04KING | 08SAN JOSE |
| 123456789 | C | KING---- | SAN JOSE-- | 04KING | 08SAN JOSE |
| 234567890 | S | WILLIAMS | SAN JOSE-- | 08WILLIAMS | 08SAN JOSE |
| 345678901 | S | WILLIAMS* | SAN JOSE-- | 10WILLIAMSON | 08SAN JOSE |
| 567890123 | S | JONES--- | MOUNTAIN V* | 05JONES | 13MOUNTAIN VIEW |
| 567890123 | S | JONES--- | MOUNTAIN V* | 05JONES | 13MOUNTAIN VIEW |

REDUCED FIXED LENGTH SORT OF VARIABLE LENGTH COLUMNS

BACKGROUND

Embodiments of the invention relate to reduced fixed length sort of variable length columns.

A DataBase Management System (DBMS) may use Structured Query Language (SQL) statements. The SQL statements have evolved into a standard language for DBMS software. The DBMS uses SQL statements for storing and retrieving data in a database. The database is organized into tables that consist of rows (also referred to as tuples or records) and columns (also referred to as fields or attributes) of data.

A table in a database may be accessed using an index. An index is an ordered set of references (e.g., pointers) to the rows in the table. The index is used to access each row in the table using a key (i.e., one of the fields or attributes of the row, which corresponds to a column). The term "key" may also be referred to as "index key" for an index. Without an index, finding a row requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

For variable length data in variable length columns of a table, such as variable length character (VARCHAR), variable length graphic (VARGRAPHIC), and variable length binary (VARBINARY), the table is created with variable length column definitions that exceed the length required to store actual data. This is often to support future requirements for data growth or application flexibility by not imposing arbitrary limits on the amount of data that a user can input.

A DBMS may use sort keys to improve sort performance, since byte-by-byte comparisons may be performed efficiently. Such sort keys may be fixed length sort keys. A table in a database may have several columns, and at least some of these columns are used for the sort key for that table. The sort key may be said to be concatenated in that several columns are used for the sort key. For variable length data, such as variable length character (VARCHAR), variable length graphic (VARGRAPHIC), and variable length binary (VARBINARY), a sort process will first pad out the columns for this data to their fixed length so that the sort key comparison occurs with each row having exactly the same key length. For example, if a name is VARCHAR and defined as having 128 bytes, and an actual name has 100 bytes, then the sort processes pads the rest of the name field (28 bytes) with, for example, blanks or spaces.

A DBMS stores variable length data in indexes and on data pages with their actual length of the data and a numeric prefix that indicates the length, rather than storing the data as its full defined length. Therefore, there is no downside for data storage of 10 bytes of actual data being stored in a VARCHAR(128) field (i.e., a field having 128 bytes) versus a VARCHAR(512) field (i.e., a field having 512 bytes), since both will only store the actual 10 bytes of data with a prefix that stores the length of the data row.

However, the downside of over-allocating the column lengths for fixed length sort is that the sort key is padded to its full defined length, meaning that the same 10 bytes will be padded with an extra 118 bytes for VARCHAR(128), or an extra 502 bytes for VARCHAR(512). This has a significant impact on the amount of memory and other resources (e.g., disk storage, intermediate work files, etc.) required to sort the rows (if sort cannot be contained in memory).

Some existing solutions use a radix sort. With this, it is recommended to group varying length columns of a sort key with same length together and separately perform a radix sort on each group of columns of the sort key for each length, in order to avoid processing the whole list of columns of the sort key on every sorting pass.

SUMMARY

Provided is a method for reduced fixed length sort of variable length columns. The method comprises: performing, using a processor of a computer, a fixed length sort to sort a table having rows for a query, wherein the fixed length sort is based on a sort key comprised of a variable length column, by: reading a pre-determined number of the rows to identify the variable length column as a candidate for truncation based on a maximum unpadded length of the variable length column and a number of the rows for which an unpadded length of the variable length column is below half of a length of the sort key, determining a length for truncating the variable length column based on database statistics and based on the reading of the pre-determined number of the rows, truncating the variable length column to the determined length to output a truncated variable length column for the sort key, and sorting the rows on the sort key having the truncated variable length column; generating results for the query using the sorted rows; and returning the results for the query.

Provided is a computer program product for reduced fixed length sort of variable length columns. The computer program product comprises: a computer readable storage medium having program code embodied therewith, the program code executable by at least one processor for: performing a fixed length sort to sort a table having rows for a query, wherein the fixed length sort is based on a sort key comprised of a variable length column, by: reading a pre-determined number of the rows to identify the variable length column as a candidate for truncation based on a maximum unpadded length of the variable length column and a number of the rows for which an unpadded length of the variable length column is below half of a length of the sort key, determining a length for truncating the variable length column based on database statistics and based on the reading of the pre-determined number of the rows, truncating the variable length column to the determined length to output a truncated variable length column for the sort key, and sorting the rows on the sort key having the truncated variable length column; generating results for the query using the sorted rows; and returning the results for the query.

Provided is a computer system for reduced fixed length sort of variable length columns. The computer system comprises: one or more processors, one or more computer-readable memories and one or more computer-readable, tangible storage devices, and program instructions, stored on at least one of the one or more computer-readable, tangible storage devices for execution by at least one of the one or more processors via at least one of the one or more memories, to perform operations comprising: performing a fixed length sort to sort a table having rows for a query, wherein the fixed length sort is based on a sort key comprised of a variable length column, by: reading a pre-determined number of the rows to identify the variable length column as a candidate for truncation based on a maximum unpadded length of the variable length column and a number of the rows for which an unpadded length of the variable length column is below half of a length of the sort key, determining a length for truncating the variable length column based on database statistics and based on the reading of the predetermined number of the rows, truncating the variable length column to the determined length to output a truncated variable length column for the sort key, and sorting the rows on the sort key having the truncated variable length column; generating results for the query using the sorted rows; and returning the results for the query.

BRIEF DESCRIPTION OF THE SEVERAL VIEWS OF THE DRAWINGS

Referring now to the drawings in which like reference numbers represent corresponding parts throughout:

FIG. 3 illustrates an example of a SELECT query that uses sort to remove duplicates due to a DISTINCT clause, and a sort key that is a mix of fixed length columns and variable length columns in accordance with certain embodiments.

FIG. 4 illustrates a sort key reordered in accordance with certain embodiments.

FIG. 5 illustrates a sort key with truncated variable length columns in accordance with certain embodiments.

FIG. 6 illustrates an example of data sorted into sequence, with truncated variable length columns and un-truncated variable length columns in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments reduce the memory and other resources (e.g., disk storage, intermediate work files, etc.) for a fixed length sort of variable length columns of a table in a database without compromising the benefit of sorting with a sort key that is fixed length.

Figure 1:
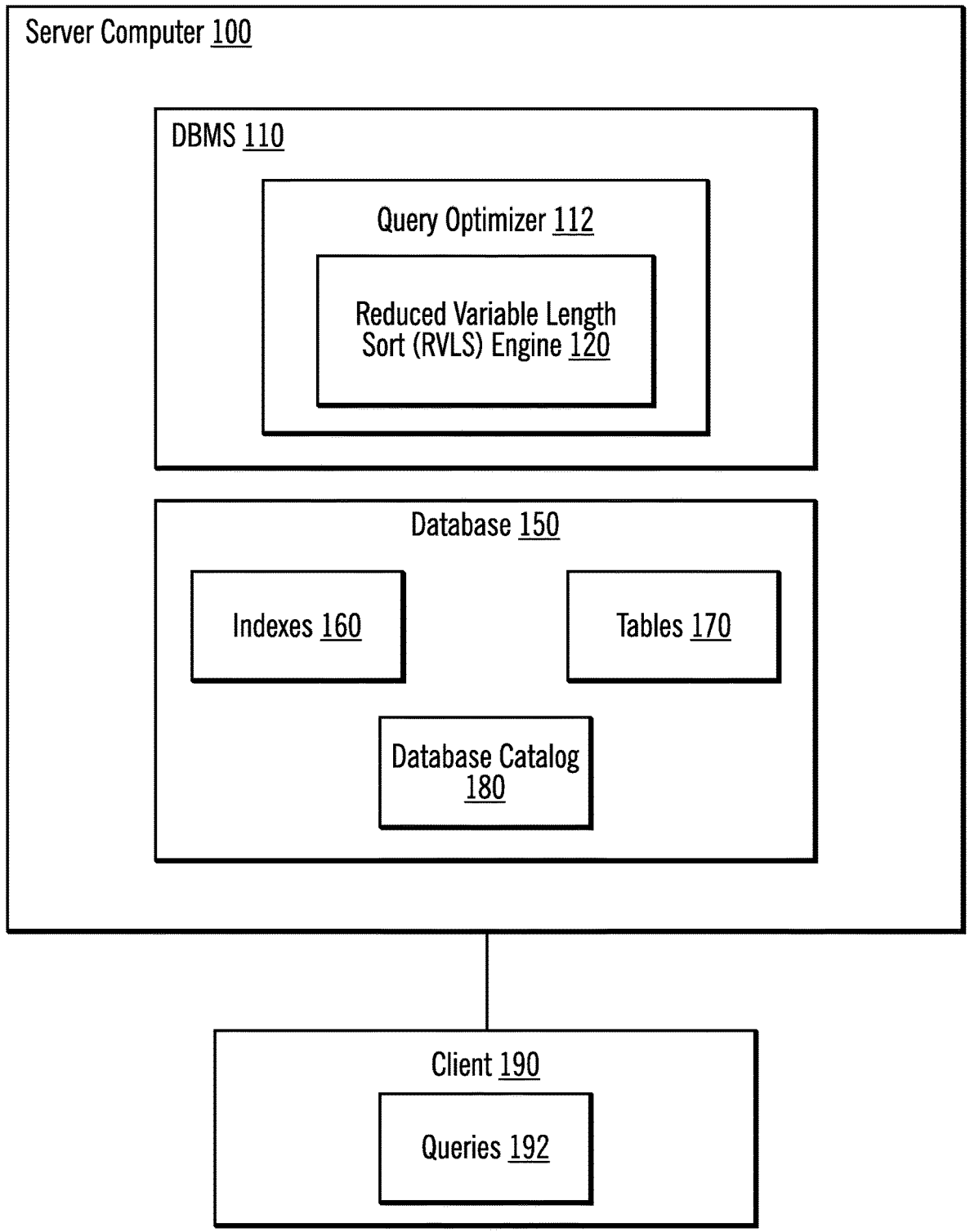
FIG. 1 illustrates, in a block diagram, a computing environment in accordance with certain embodiments.

FIG. 1 illustrates, in a block diagram, a computing environment in accordance with certain embodiments. In FIG. 1, a server computer 100 is coupled to a client computer 190. The server computer 100 includes DataBase Management System (DBMS) 110 and database 150. The client computer 190 issues queries 192 to the server computer 100. The DBMS 110 includes a query optimizer 112, which includes a Reduced Variable Length Sort (RVLS) engine 120. The query optimizer 112 and RVLS engine 120 execute the queries 192. The database 150 includes indexes 160, tables 170, and a database catalog 180. Each of the tables 170 may include one or more variable length columns, such as variable length character (VARCHAR) columns, variable length graphic (VARGRAPHIC) columns, and variable length binary (VARBINARY) columns. A query of the queries 192 may use a sort, which is performed by the RVLS engine 120, while the DBMS 110 is executing the query. The database catalog 180 may be described as tables and indexes owned by the DBMS 110.

The RVLS engine 120 truncates a variable length column within the sort key based upon inspecting a small number of input rows of a table to be sorted to first determine an appropriate length.

For sorts that are removing duplicates (e.g., GROUP BY, DISTINCT or subquery result), the RVLS engine 120 performs collapsing of inputs via traditional hashing techniques before truncating the sort key.

Also for non-ORDER BY sorts, the RVLS engine 120 reorders the sort key to ensure the longest columns are positioned at the end of the sort key. This minimizes the risk of duplicates introduced by truncation, and allows other preceding (non-truncated) columns to ensure that sort keys are differentiated without having to resort to resolving the duplication by processing the truncated variable length columns separately.

With embodiments, the RVLS engine 120 performs fixed length sort on the truncated variable length columns, and, when consecutive duplicates are found up to and including the truncated portion (truncated variable length columns) of the sort key, the differentiation occurs against the data portion of the rows where the original value (neither padded nor truncated) is stored.

With other embodiments, if too many rows exceed the original truncated length, the RVLS engine 120 splits the rows into truncated and fully padded sorts. With a final merge process, the RVLS engine 120 reads in the truncated variable length columns and rebuilds the sort key padding to full length, and the RVLS engine 120 merges rows from that truncated sort with the rows that were sorted by the fully padded sort (as originally padded to full length).

The RVLS engine 120 provides the performance benefit of fixed length sort, while reducing the memory (and other resources) used for sort, and optimizing sort for the fixed length columns and shorter length columns of the sort key.

With embodiments, the sort key is constructed based upon the column sequence from a SELECT statement for DISTINCT, or from the explicit column list in an ORDER BY or GROUP BY clause. Herein, the "ORDER BY sorts" is used to categorize any sort that is to maintain the original order, including sorts for joins. Sorts for duplicate removal, that do not require order otherwise, are typically able to allow the RVLS engine 120 to reorder the sort columns to optimize performance.

If the sort key contains variable length columns (such as VARCHAR, VARGRAPHIC, VARBINARY), then the sort process will traditionally pad those columns to their full defined length for sorting with fixed length sort keys.

Figure 2A:
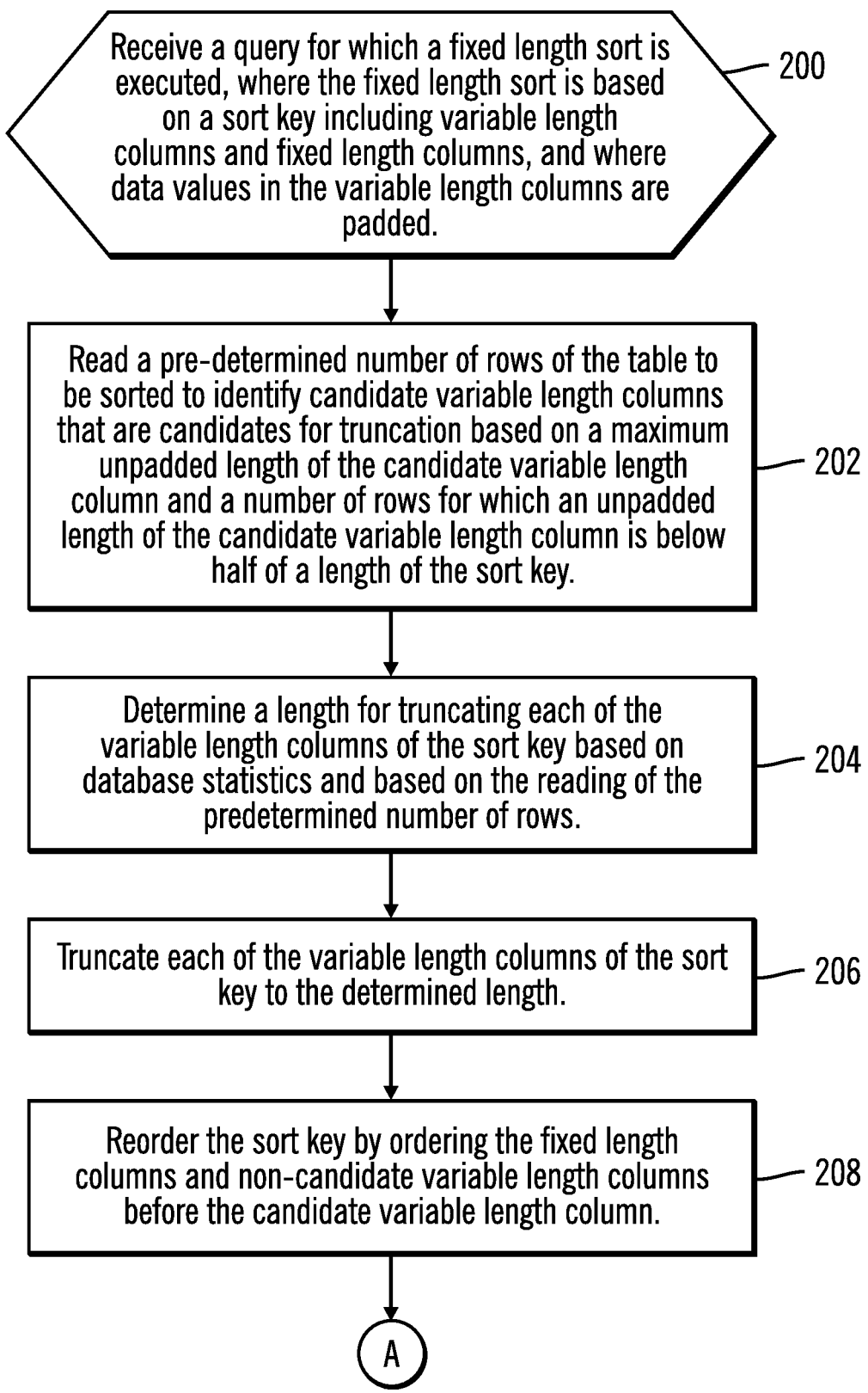
FIGS. 2A and 2B illustrates, in a flow chart, operations for a reduced fixed length sort of a variable length column of a table in accordance with certain embodiments.
Figure 2B:
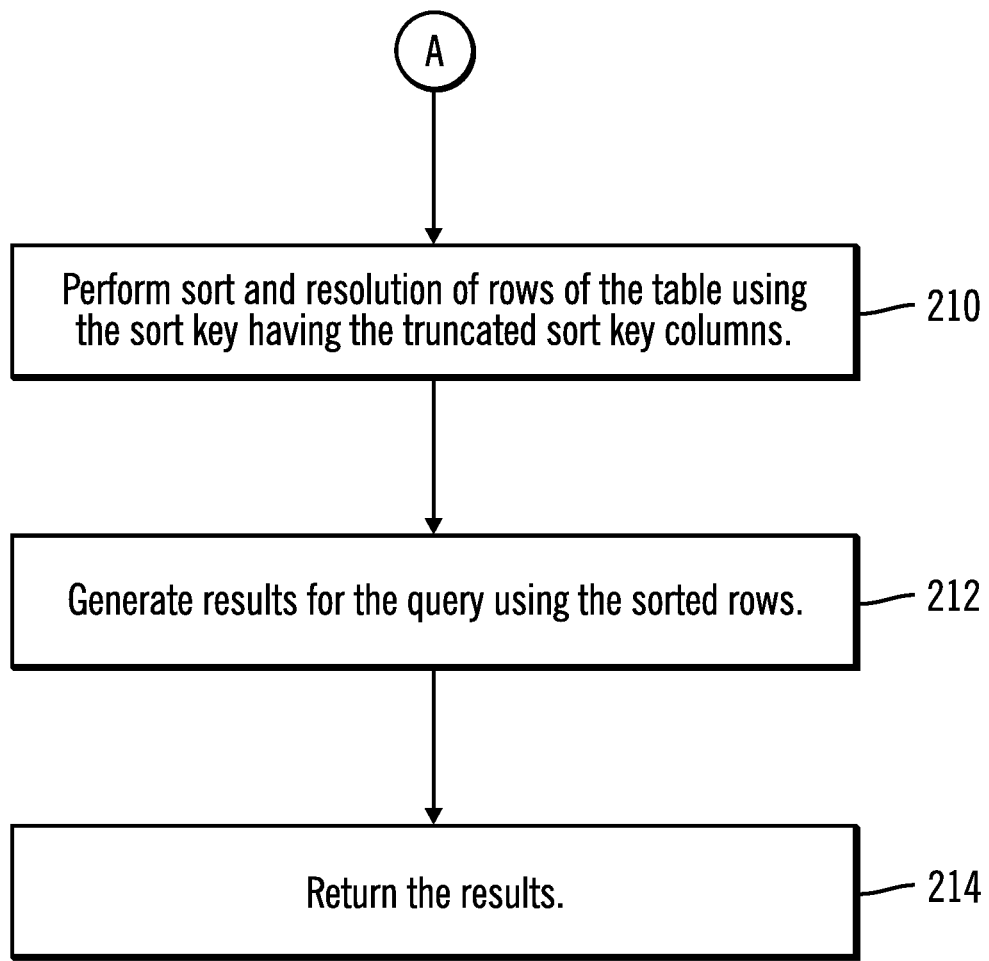

FIGS. 2A and 2B illustrates, in a flow chart, operations for a reduced fixed length sort of a variable length column of a table in accordance with certain embodiments. Control begins at block 200 with the RVLS engine 120 receiving a query for which a fixed length sort is executed, where the fixed length sort is based on a sort key having variable length columns and fixed length columns, and where data values in the variable length column are padded. In various embodiments, there may be one variable length column with another column, which is either another variable length column or a fixed length column.

In block 202, the RVLS engine 120 reads a pre-determined number of rows of the table to be sorted to identify candidate variable length columns, of the table, that are candidates for truncation based on a maximum unpadded length of the candidate variable length column and a number of rows for which an unpadded length of the candidate variable length column is below half of a length of the sort key. The candidate variable length columns are candidates for truncation. The pre-determined number of rows to be read may be modified by, for example, a system administrator.

Thus, initially, the RVLS engine 120 reads the first n rows as input to the sort, where n may is a small number (e.g., 100) to achieve a representative sample of rows of the table (which may have a large number of rows). This may occur before constructing the sort key, to determine the applicability of further processing. For example, for each variable length column that is a portion of the sort key, the RVLS engine 120 records the maximum unpadded length for those first n rows and records the number of rows that are below 50% of the defined length.

With embodiments, the DBMS 110 stores the $2^{nd}$ highest and $2^{nd}$ lowest value for each column. This allows the query optimizer 112 to know the range of the data. The reason that the DBMS 110 stores the $2^{nd}$ lowest/highest and not the absolute lowest/highest is typically because there is often 1 value that is set to a maximum, and thus it may distort the true range. For example, for a column ORDER_END_DATE, when an order ends, this column value is updated to the end date, and thus orders may have end dates ranging throughout the last 10 years. However, "open" orders may have an ORDER_END_DATE='9999-12-31' to represent a future date. HIGH2KEY may equal todays date, but HIGHKEY is '9999-12-31'. Storing '9999-12-31' as the high date is not a true representation of the actual data range, since there are no values between today and '9999-12-30', hence the reason for storing LOW2KEY and HIGH2KEY.

The approximate length of the data may be updated by existing database statistics in a database catalog, such as HIGH2KEY, LOW2KEY, frequency statistics, quantile/histograms (that also have a HIGHKEY/LOWKEY), and also the average row length that is often captured at the table level. The query optimizer 112 (which is an access path selection component) may evaluate this information (e.g., the LOW2KEY and HIGH2KEY) and provide it as additional information into the decision for the length of the sort key. For example, the LOW2KEY, HIGH2KEY, and other statistics may serve as a very small sample of the data stored in the table and may be used to see what lengths of the variable length columns exist within this small set. This may be used as input to the decision for the length at which to truncate. A further optimization includes using a database statistics collection mechanism to capture the length information and store it in the database catalog. This will increase the accuracy of the sort key truncation, but requires additional processing for the database statistics collection and catalog table additions.

In FIG. 2A, block 204, the RVLS engine 120 determines a length for truncating each of the variable length columns of the sort key based on database statistics and based on the reading of the pre-determined number of rows.

Having already identified variable length columns that are candidates for key truncation, the RVLS engine 120 determines the actual amount that is to be truncated for each of the variable length columns, and this depends on numerous factors including, but not limited to:

The cardinality of any fixed length columns and non-candidate variable length columns in the sort key.

Whether the highest cardinality columns appear before or after the truncated variable length columns.

The actual or estimated length of the variable length columns.

The number of rows within the sample that are above and below a set threshold (e.g., 50%).

The RVLS engine 120 also evaluates space savings versus risk of truncating non-blank characters.

In FIG. 2A, block 206, the RVLS engine 120 truncates each of the variable length columns of the sort key to the determined length. This results in a truncated variable length column for each of the variable length columns of the sort key.

In block 208, the RVLS engine 120 reorders the sort key by ordering any fixed length columns and non-candidate variable length columns before the candidate variable length column. From block 208 (FIG. 2A), processing continues to block 210 (FIG. 2B).

In block 210, the RVLS engine 120 performs sort and resolution of rows of the table (to be sorted, which is referenced in the query) using the sort key having the truncated sort key columns. In block 212, the RVLS engine 120 generates results for the query using the sorted rows. This may include executing other predicates in the query, etc. In block 214, the RVLS engine 120 returns the results (e.g., to the client computer 190) in response to the query (received in block 200).

Although FIGS. 2A and 2B describe a sort key including variable length columns and fixed length columns, with embodiments, the sort key may include one variable length column, which is truncated. Also, with embodiments, the sort key may include one variable length column that is truncated and another column (either a fixed length column or a variable length column) that are reordered.

With embodiments, as rows are input to the sort preparation process, and after any hashing is performed to consolidate duplicates (for sorts that remove duplicates), then the RVLS engine 120 constructs the sort key, including truncated variable length columns, based upon reordering of the columns of the sort key or the original sequence (if the sort cannot reorder the sort columns).

With embodiments, the RVLS engine 120 moves the candidate variable length columns after all non-candidate variable length columns (including variable length columns not considered candidates) in the sort key. With embodiments, this applies to duplicate removal queries since column order for sort is not important. There are two exceptions to this: 1) if the query also contains an ORDER BY and one sort can achieve both the duplicate removal and ordering, or 2) where the query optimizer 112 has determined that data is being passed into sort in an approximate order. Sort of data that is already in approximate order is generally more efficient than sorting data that is in random order. However, other columns not required for the ordering are candidates for reordering. For example, given a query SELECT DISTINCT C1, C2, C3, C4, C5 for which the query optimizer 112 determines that input to the sort is provided by columns C1, C2, then the three remaining columns C3, C4, C5 are candidates to be reordered.

FIG. 3 illustrates an example of a SELECT query that uses sort to remove duplicates due to a DISTINCT clause, and a sort key that is a mix of fixed length columns and variable length columns in accordance with certain embodiments. The sort key 310 has four columns. The fixed length columns of the sort key are: Account_Type and Account_Num. The variable length columns of the sort key that are candidates for truncation are: City and Lastname. In this example, the variable length columns are padded to their full length for illustrative purposes, as indicated by the dashes in FIG. 3, and become candidates for truncation because of the short length of the stored data compared to the defined length of the columns.

If the columns of the sort key 310 can be reordered for sort, then the sort key order leads with the fixed length columns and non-candidate variable length columns first, followed by the candidate variable length columns. Within each grouping of non-candidate variable length columns and candidate variable length columns, the columns are ordered from highest cardinality to lowest cardinality. FIG. 4 illustrates a sort key reordered in accordance with certain embodiments. In particular, the sort key 310 (FIG. 3) is reordered as shown in sort key 410 (FIG. 4) to separate fixed length columns and variable length columns, and within each group of columns, ordering from highest to lowest cardinality. In particular, the original order of the sort key was: Account_Type, City, Lastname, and Account_Num. The new order of the sort key is: Account_Num, Account_Type, Lastname, and City.

With embodiments, reordering the sort key columns increases the likelihood that sort key comparisons will result in finding key differentiation quickly, but also that sort key duplication of the full sort key is less likely to be introduced when looking at the earlier portion of the sort key due to the truncated variable length columns appearing later in the concatenated sort key. In certain embodiments, the sort key is not reordered.

FIG. 5 illustrates a sort key 500 with truncated variable length columns in accordance with certain embodiments. With embodiments, data values of variable length columns that have had information truncated from the sort key are indicated with a flag (e.g., an asterisk (e.g., Lastname "WILLIAMSON" is truncated to fit in 8 characters (CHAR (8) as "WILLIAMS*")). Embodiments allow easy identification of columns that have had non-blank characters truncated, which assists in resolution of those rows during sort.

If all rows of truncated variable length columns only removed trailing blanks, then the sort is able to complete on the truncated variable length columns without the need to resolve the truncated part of consecutive rows. This is the optimal scenario since space is reduced without any overhead of resolution of truncation of non-blank characters.

For rows of the variable length columns where non-blank characters were truncated, then embodiments provide two solutions that may be implemented separately or together. The decision to choose one solution over the other may be implementation dependent. For example, the first solution, may be the more space efficient, and, thus, if reduced memory and disk usage is the goal, then the first solution is preferred. The second solution may align better with an existing implementation of fixed length sorting and is therefore simpler to integrate this into such a system. An implementation may combine both solutions to allow the decision of reduced storage or reduced central processor usage based upon the input estimation process and the ability to reorder columns to reduce conflicts from truncation.

With the first solution, the RVLS engine 120 sorts with the truncated portion (columns) of the sort key, and, if consecutive rows are equal on the columns of the sort key, but one or both of those rows are flagged as having non-blank characters truncated, then the RVLS engine 120 traverses the data portion of the truncated variable length columns, where the original column value is stored, to determine how to order these consecutive rows.

FIG. 6 illustrates an example of data 610 sorted into sequence, with truncated variable length columns and un-truncated variable length columns in accordance with certain embodiments. In FIG. 6, the RVLS engine 120 places an asterisk next to data values that have had non-blank characters truncated. The data portion is prefixed with the column length (e.g., "04KING" indicates that this column has a length of four characters, "KING"). In certain embodiments, for the fixed length sort to duplicate the data for variable length keys, as shown with Data col1 and Data col2 in FIG. 6.

In the example of FIG. 6, only the 5th and 6th rows require resolution of the truncated variable length column value with the data portion, since all other key values are equal for those rows. Resolving to the data portion of "Data col2" determines that both rows are duplicates and thus sort would consolidate these rows given the original DISTINCT in the query 300 (FIG. 3).

Since traversing the data portion adds processor (Central Processing Unit) overhead, it is not a desirable solution if a large percentage of rows would result in truncation of non-blank portions of the variable length column of the sort key. However, resolution of the variable length columns of the sort key with the data portion is performed if there are duplicate rows, given all other columns of the sort key. For example, given the fourth row, where 'WILLIAMSON" is truncated to "WILLIAMS", this row does not require resolution with the data portion of the key since the other columns of the sort key already distinguish this row.

As another example of the first solution, if a variable length column is VARCHAR(128), and the truncated length=32 bytes, then duplicates are resolved based upon 32 bytes from the data portion (original column).

With the second solution for resolving keys where non-blank characters are truncated is to create two sort processes: one sort for truncated variable length columns of the sort key and the other sort for non-truncated columns of the sort key that are padded out to their full definition length. Thus, the sorts are for different column lengths. Both sorts occur separately, and the final merge occurs with the two sorted results. Before the final merge, the truncated variable length columns of the sort key are padded out to their full length to allow a simple merge of the two results to occur with their full fixed length sort keys.

As an example of the second solution, if a variable length column is VARCHAR(128), and the truncated length=32 bytes, then rows of that variable length column that are <=32 bytes are padded to 32 and sent to sort 1, while the rows of that variable length column that are >32 bytes are padded to 128 and sent to sort 2. Then, there is a final merge of both sorts (sort 1 is rebuilt to 128 bytes to allow merge). Although two sorts are provided as an example, any number of sorts may be used.

With some embodiments, this second solution may not reduce space usage if a large percentage of the rows require padding to their full key definition length. It also results in rows being padded to full length and written to the second sort without knowledge of whether other columns would have distinguished the row.

With embodiments, applying a more conservative truncation value may reduce the number of rows that require either solution to address rows with lengths above and below the identified truncation threshold. This may be achieved with a larger sample size or other previously mentioned techniques such as utilizing sampled statistics of high/low keys and frequency statistics to improve the knowledge of maximum and average or median stored lengths.

The approach of separating the truncated columns and full length columns into separate sorts may require the least development effort for a fixed length sort.

For either solution, hashing of the input columns of the sort key for duplicate removal sorts may be applied before determining to pad or truncate. This has the benefit of potentially reducing duplicates early.

Embodiments also apply to truncation of long fixed length columns, where there exist trailing blanks. Applying embodiments to fixed length columns requires inspection of the data within those columns.

Embodiments reduce space usage within a fixed length sort and maintain the performance benefit of the fixed length sort. Embodiments optimize truncation length to reduce overhead of additional processing involved with resolving keys greater than the truncated length.

Embodiments reduce the width of variable length columns for a fixed length (i.e., fixed width) sort. Embodiments include optimizations (e.g., truncation width tuning, column reordering) that reduce the frequency with which the column truncation impacts the sort outcome.

Thus, embodiments perform a fixed length sort to sort a table having rows for a query, where the fixed length sort is based on a sort key including a variable length column, by: reading a pre-determined number of the rows to identify the variable length column as a candidate for truncation based on a maximum unpadded length of the variable length column and a number of the rows for which an unpadded length of the variable length column is below half of a length of the sort key; determining a length for truncating the variable length column based on database statistics and based on the reading of the pre-determined number of the rows; truncating the variable length column to the determined length to output a truncated variable length column for the sort key; and sorting the rows on the sort key having the truncated variable length columns. Then, the sorted rows may be used to generate results for the query, which are returned.

With embodiments, each of data value of the truncated variable length column has a flag that indicates that information has been truncated from that data value.

With embodiments, the sorting further includes, for consecutive rows flagged as having non-blank characters truncated, traversing a data portion of the truncated variable length column for the consecutive rows to determine how to order the consecutive rows.

With embodiments, the sort key is includes a variable length column and another column, where the another column is one of a fixed length column and another variable length column, and the sort key is reordered by ordering the another column before the variable length column.

With embodiments, the sorting further includes: sorting the rows on the variable length column of the sort key; sorting the rows on the another column of the sort key; and merging the rows of the variable length column and the another column.

Figure 7:
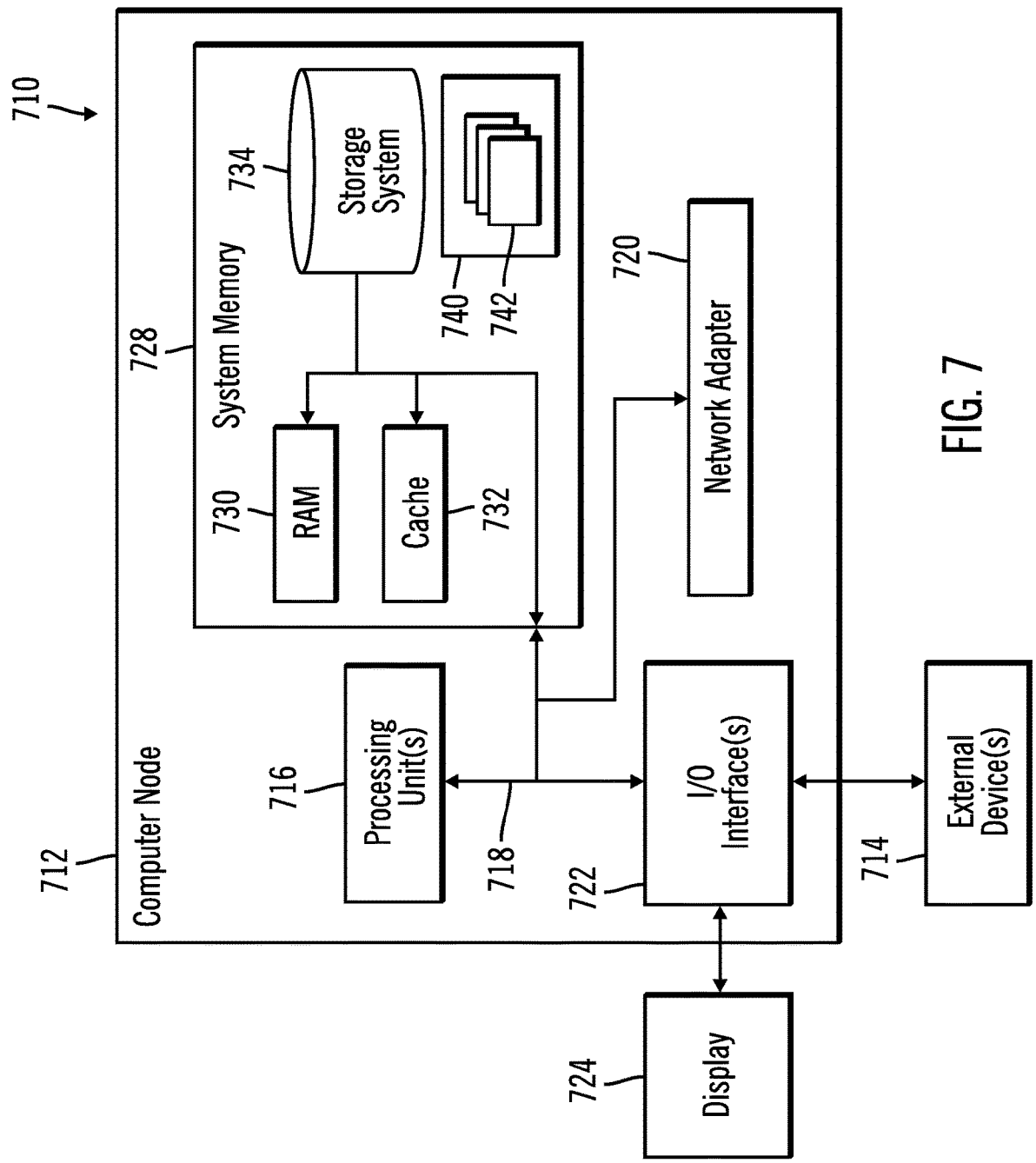
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 in cloud computing node 710 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the server computer 100 and/or the client computer 190 has the architecture of computer node 712. In certain embodiments, the server computer 100 and/or the client computer 190 is part of a cloud infrastructure. In certain alternative embodiments, the server computer 100 and/or the client computer 190 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
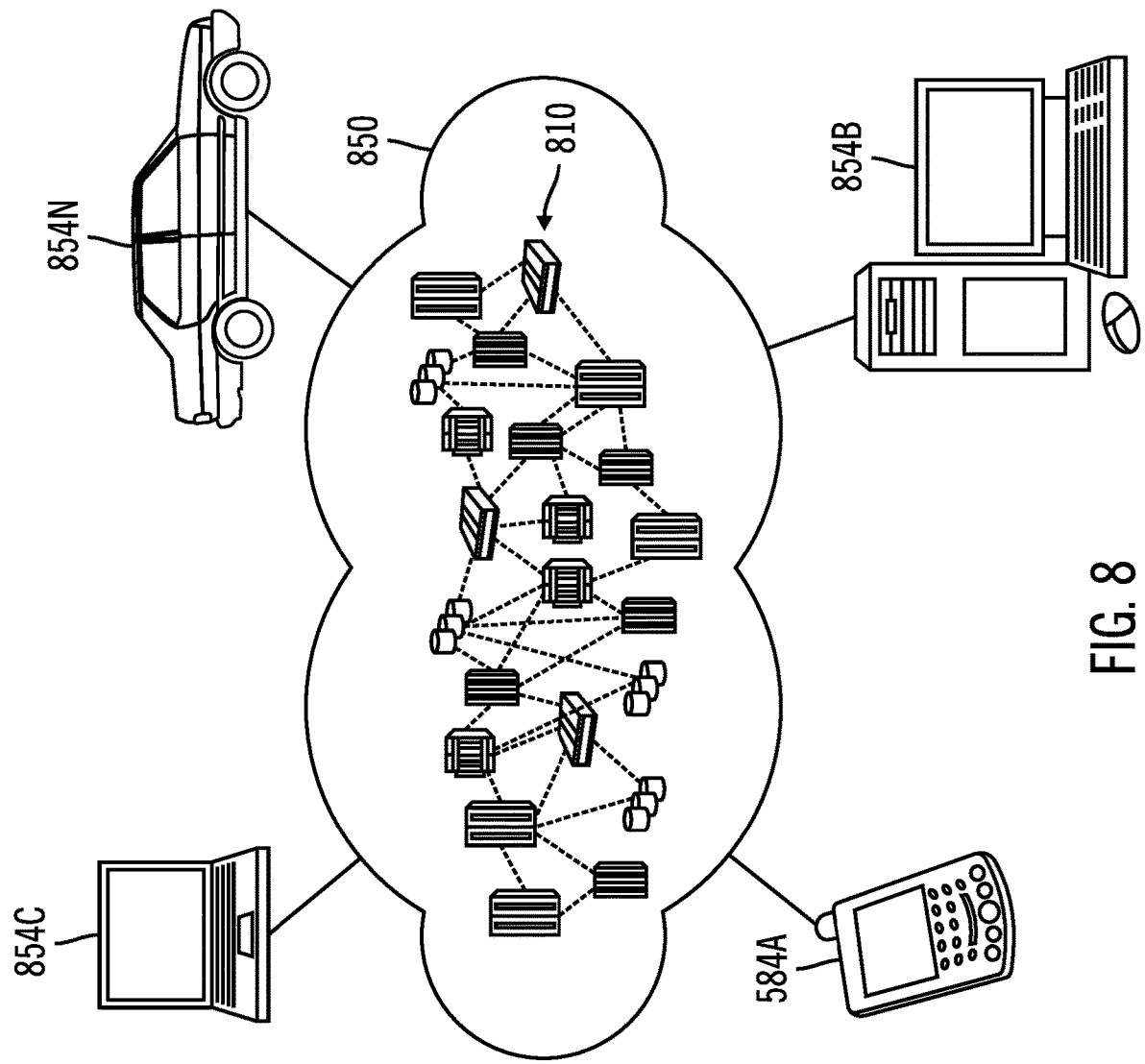
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
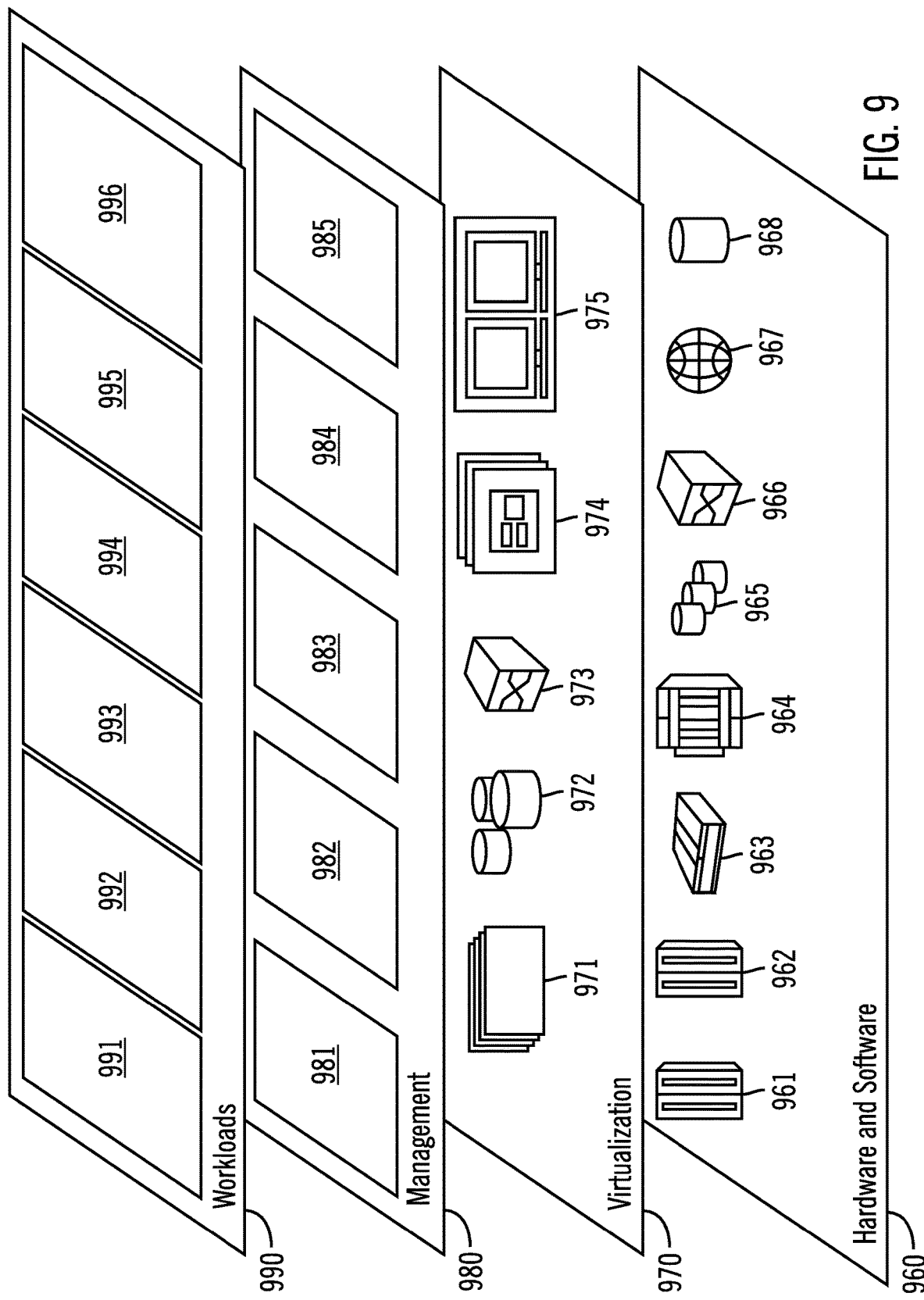
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and reduced fixed length sort of variable length columns 996

Thus, in certain embodiments, software or a program, implementing reduced fixed length sort of variable length columns in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising operations for:
    performing, using a processor of a computer, a fixed length sort to sort a table having rows for a query, wherein the fixed length sort is based on a sort key comprised of a variable length column, by:
        reading a pre-determined number of the rows to identify the variable length column as a candidate for truncation based on a maximum unpadded length of the variable length column and a number of the rows for which an unpadded length of the variable length column is below half of a length of the sort key;
        determining a length for truncating the variable length column based on database statistics and based on the reading of the pre-determined number of the rows;
        truncating the variable length column to the determined length to output a truncated variable length column for the sort key, wherein each data value of the truncated variable length column has a flag that indicates that information has been truncated from that data value; and
        sorting the rows on the sort key having the truncated variable length column;
    generating results for the query using the sorted rows; and
    returning the results for the query.

2. The method of claim 1, wherein the sorting further comprises operations for:
    for consecutive rows flagged as having non-blank characters truncated, traversing a data portion of the truncated variable length column for the consecutive rows to determine how to order the consecutive rows.

3. The method of claim 1, wherein the sort key is comprised of the variable length column and another column, wherein the another column is one of a fixed length column and another variable length column, and further comprising operations for:
    reordering the sort key by ordering the another column before the variable length column.

4. The method of claim 3, wherein the database statistics include at least one of:
    a) a cardinality of the truncated variable length column and the another column in the sort key;
    b) whether a highest cardinality column appears before the truncated variable length column;
    c) at least an estimated length of the variable length column; and d) a number of rows within the pre-determined number of the rows that are above and below a set threshold.

5. The method of claim 3, wherein the sorting further comprises operations for:
sorting the rows on the variable length column of the sort key;
sorting the rows on the another column of the sort key; and
merging the rows of the variable length column and the another column.

6. The method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:
performing a fixed length sort to sort a table having rows for a query, wherein the fixed length sort is based on a sort key comprised of a variable length column, by:
reading a pre-determined number of the rows to identify the variable length column as a candidate for truncation based on a maximum unpadded length of the variable length column and a number of the rows for which an unpadded length of the variable length column is below half of a length of the sort key;
determining a length for truncating the variable length column based on database statistics and based on the reading of the pre-determined number of the rows;
truncating the variable length column to the determined length to output a truncated variable length column for the sort key, wherein each data value of the truncated variable length column has a flag that indicates that information has been truncated from that data value; and
sorting the rows on the sort key having the truncated variable length column;
generating results for the query using the sorted rows; and
returning the results for the query.

8. The computer program product of claim 7, wherein, for the sorting, the program code is executable by the at least one processor to further perform operations for:
for consecutive rows flagged as having non-blank characters truncated, traversing a data portion of the truncated variable length column for the consecutive rows to determine how to order the consecutive rows.

9. The computer program product of claim 7, wherein the sort key is comprised of the variable length column and another column, wherein the another column is one of a fixed length column and another variable length column, and wherein the program code is executable by the at least one processor to further perform operations for:
reordering the sort key by ordering the another column before the variable length column.

10. The computer program product of claim 9, wherein the database statistics include at least one of:
a) a cardinality of the truncated variable length column and the another column in the sort key;
b) whether a highest cardinality column appears before the truncated variable length column;
c) at least an estimated length of the variable length column; and
d) a number of rows within the pre-determined number of the rows that are above and below a set threshold.

11. The computer program product of claim 9, wherein, for the sorting, the program code is executable by the at least one processor to further perform operations for:
sorting the rows on the variable length column of the sort key;
sorting the rows on the another column of the sort key; and
merging the rows of the variable length column and the another column.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
performing a fixed length sort to sort a table having rows for a query, wherein the fixed length sort is based on a sort key comprised of a variable length column, by:
reading a pre-determined number of the rows to identify the variable length column as a candidate for truncation based on a maximum unpadded length of the variable length column and a number of the rows for which an unpadded length of the variable length column is below half of a length of the sort key;
determining a length for truncating the variable length column based on database statistics and based on the reading of the pre-determined number of the rows;
truncating the variable length column to the determined length to output a truncated variable length column for the sort key, wherein each data value of the truncated variable length column has a flag that indicates that information has been truncated from that data value; and
sorting the rows on the sort key having the truncated variable length column;
generating results for the query using the sorted rows; and
returning the results for the query.

14. The computer system of claim 13, wherein the sorting further comprises operations for:
for consecutive rows flagged as having non-blank characters truncated, traversing a data portion of the truncated variable length column for the consecutive rows to determine how to order the consecutive rows.

15. The computer system of claim 13, wherein the sort key is comprised of the variable length column and another column, wherein the another column is one of a fixed length column and another variable length column, and further comprising operations for:
reordering the sort key by ordering the another column before the variable length column.

16. The computer system of claim 13, wherein a Software as a Service (SaaS) is configured to perform the operations of the computer system.

17. The computer system of claim 15, wherein the sorting further comprises operations for:
sorting the rows on the variable length column of the sort key;
sorting the rows on the another column of the sort key; and
merging the rows of the variable length column and the another column.

18. The computer system of claim 15, wherein the database statistics include at least one of:
   a) a cardinality of the truncated variable length column and the another column in the sort key;
   b) whether a highest cardinality column appears before the truncated variable length column;
   c) at least an estimated length of the variable length column; and
   d) a number of rows within the pre-determined number of the rows that are above and below a set threshold.

\* \* \* \* \*